INVENTOR.
Robert A. Blood
BY Bodell & Thompson
ATTORNEYS.

Patented Apr. 20, 1943

2,316,835

UNITED STATES PATENT OFFICE 2,316,835

EXPLOSIONPROOF ENCLOSURE FOR ELECTRICAL DEVICES

Robert A. Blood, Syracuse, N. Y., assignor to Crouse-Hinds Company, Syracuse, N. Y., a corporation of New York Application September 12, 1940, Serial No. 356,513

6 Claims. (Cl. 174—50)

This invention relates to an explosionproof electrical fitting.

The invention has as an object a fitting of the type referred to embodying a structure by which the interior of the fitting is divided into a wiring compartment and a compartment in which an electrical device, such as a switch, fuse, lamp socket, etc., is mounted, the compartments being separated by a flame tight partition, and the device compartment being provided with a cover or closure detachably secured to the fitting in flame tight relationship thereto, whereby each of the compartments comprise a flame tight enclosure and are separated by a flame tight partition.

The invention further embodies a structural arrangement by which access is had to both compartments to permit the fitting to be conveniently wired.

The invention has as a further object, a structure by which the fitting can be conveniently and neatly mounted in a panel support.

The invention consists in the novel features and in the combinations and constructions hereinafter set forth and claimed.

In describing this invention, reference is had to the accompanying drawings in which like characters designate corresponding parts in all the views.

Figure 1:
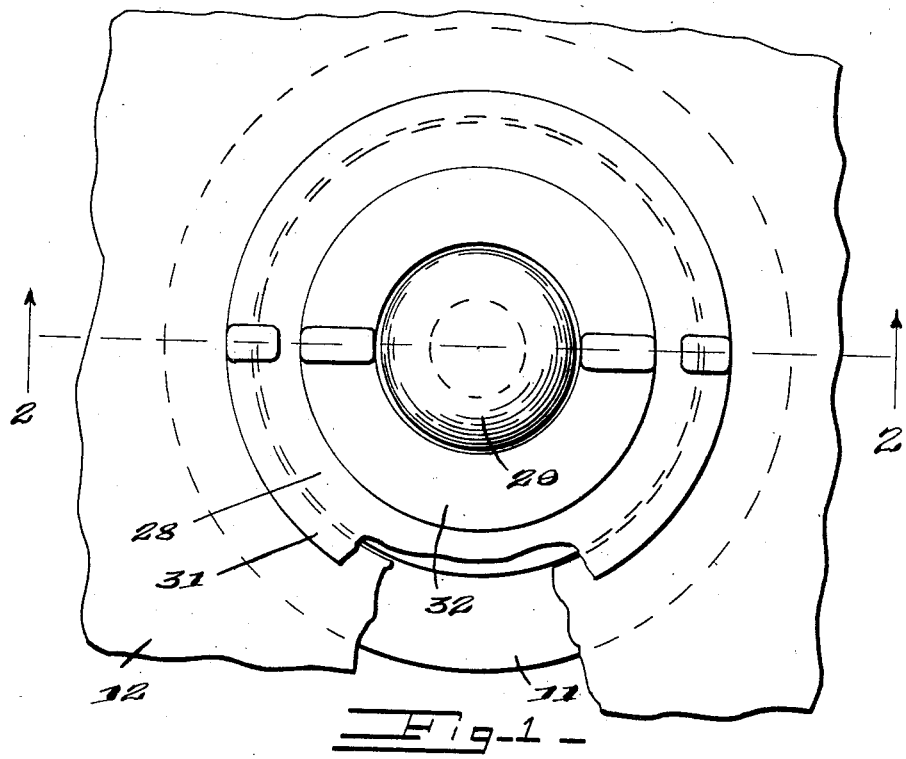
Figure 1 is a top plan view of an electrical fitting embodying my invention showing a contiguous portion of the mounting panel.
Figure 2:
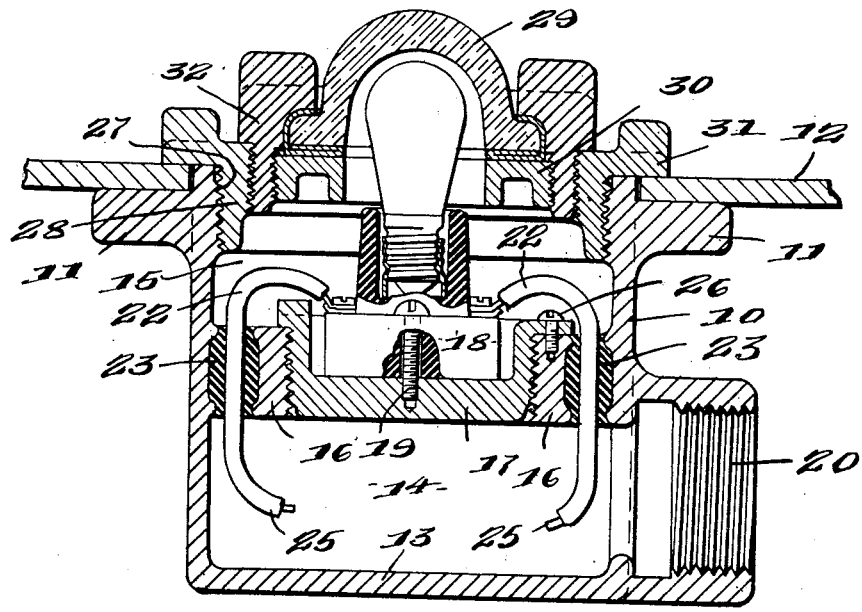
Figure 2 is a vertical sectional view of the structure shown in Figure 1.

The fitting illustrated comprises a body member 10 of general circular form provided with a substantial opening in one side and may be formed with an annular flange 11 encircling the opening and being spaced axially from the marginal edge of the opening a sufficient distance to accommodate a panel 12.

The body is provided with a partition arranged intermediate the open end of the body and the bottom wall 13 thereof and serves to divide the body into a wiring compartment 14 and a compartment 15 in which an electrical device may be mounted and which is hereinafter referred to as the device compartment. The partition is formed with an opening to permit access to the wiring compartment 14 through the device compartment 15, and a closure is provided for this opening and is detachably secured in the body in flame tight relationship thereto.

In the illustrated form, the partition consists of an annular flange 16 formed with a central aperture of appreciable dimension, and the partition further includes a plug or closure 17 detachably secured to the flange 16 as by being threaded therein.

A device, such as the receptacle 18, is mounted in the device compartment 15, as for example by being secured to the plug 17 by screws 19. When the plug portion 17 of the partition is threaded into the flange 16, the partition forms a flame tight wall between the compartments 14, 15, and also serves as a supporting member for the receptacle member 18.

The body 10 is formed with one or more threaded apertures 20 to receive the end of a conduit line, the aperture 20 leading into the wiring compartment 14 in the bottom of the body. A plurality of lead conductors 22 extend from the device compartment 15 into the wiring compartment 14 and are arranged in flame tight relation to the partition as by being sealed therein with suitable compound as at 23.

Figure 3:
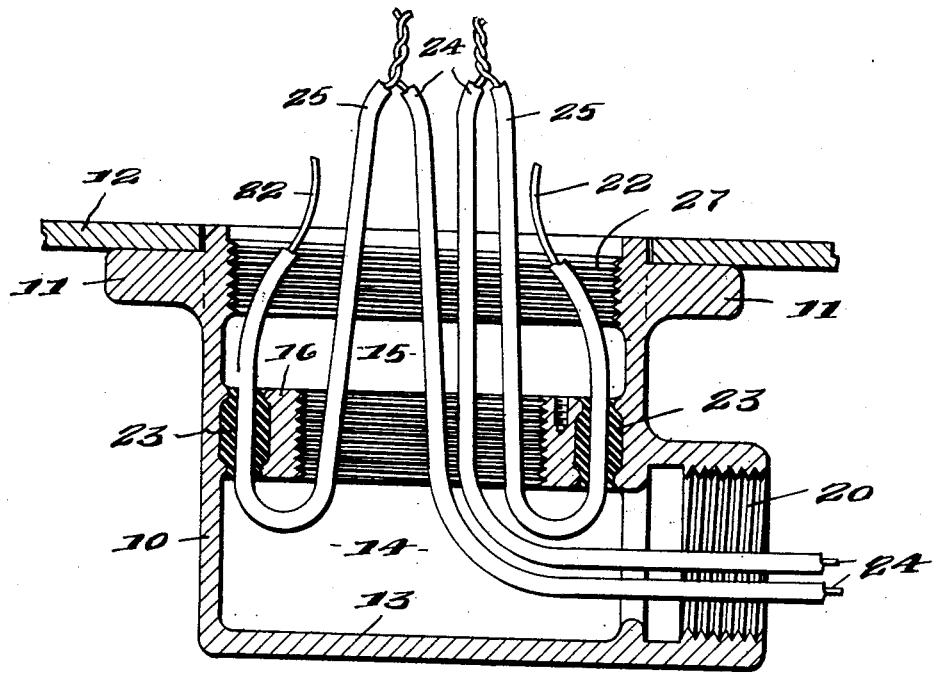
Figure 3 is a vertical sectional view through the body member of the fitting illustrating the manner in which the lead conductors are connected to the line conductors.
Figure 4:
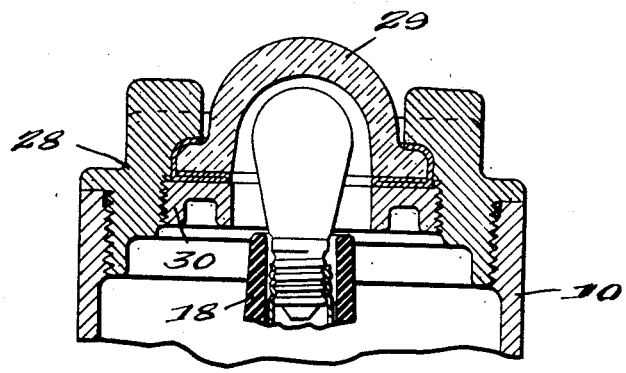
Figure 4 is a fragmentary vertical sectional view illustrating a modification of the structures shown in Figures 1 to 3.

When the fitting is installed, the lead conductors 22 are detached from the terminals of the device 18 and the plug 17 is unthreaded from the flange 16. The interior of the body, including both compartments, is then accessible for the manipulation of the line conductors 24. When the body has been installed in the conduit run, the free ends of the line conductors 24 and the inner ends 25 of the lead conductors 22 are drawn outwardly through the opening in the partition and into the device compartment, or to the outside of the fitting, as shown in Figure 3, through the opening in the top thereof where the lead conductors may be conveniently attached to the line conductors 24. Subsequently, the spliced ends of the line and lead conductors are pushed back through the partition into the wiring compartment 14. Thereafter, the plug or closure 17 is threaded into the flange 16 completing the partition between the compartments. The plug 17 is held against displacement by a screw 26 extending through the flange portion of the plug and threading into the flange 16.

The device compartment is enclosed by a cover member detachably secured to the open end of the box in flame tight relationship thereto. In the structure illustrated, the open end of the box is provided with internal threads 27 to receive an externally threaded cover. The cover may be of integral construction. However, inasmuch as the device illustrated consists of a lighting unit, the cover shown comprises an annular member 28 formed with a central aperture in which a dome shaped lens 29 is mounted and secured in position by a bezel 30 threading into the member 28.

The fitting illustrated in Figures 1 and 3 is adapted for panel mounting, the panel 12 being formed with an aperture to receive the open end of the fitting, with the flange 11 of the body engaging the rear side of the panel, and the cover is provided with a radially extending portion 31 overlying the face side of the panel. In this instance, the lens 29 and bezel 30 are not mounted directly in the annular member 28, but in an annular member 32 threaded into the member 28. With this structure, access is had to the device compartment 15, as for the purpose of relamping the receptacle, by unscrewing the cover assembly 29, 30, 32 from the annular member 28 without disturbing the mounting of the fitting.

What I claim is:

1. An explosionproof enclosure comprising a body formed with an opening in one side thereof and an internally threaded bore arranged below said opening, a supporting plate for supporting an electrical device, said plate threading into said bore and dividing the body into a device compartment and a wiring compartment, said body being also formed with a conduit receiving passage leading into said wiring compartment, lead conductors sealed in said body and extending from said device compartment into said wiring compartment, and a closure detachably secured to the open side of the body in flame tight relationship thereto.

2. An explosionproof enclosure for electrical devices comprising a body formed with an opening in one side thereof, a device supporting member detachably mounted in the body, said supporting member dividing the body into a device compartment and a wiring compartment and forming a flame tight partition between said compartments, said body being also formed with a conduit receiving passage leading into said wiring compartment, a plurality of lead conductors extending from said device compartment into said wiring compartment and being sealed in flame tight relation in the body, and a closure member detachably secured to the open side of the body in flame tight relationship thereto.

3. An explosionproof enclosure for electrical devices comprising a body formed with an opening in one side thereof and being provided with a partition arranged intermediate the open end of the body and the bottom thereof and dividing the body into a device compartment and a wiring compartment, said partition being formed with an opening to permit access to said wiring compartment through the opening in the body, a closure member detachably secured in said partition and forming a flame tight closure for the opening therein, a plurality of lead conductors extending from said device compartment through said partition into said wiring compartment and being sealed in flame tight relation in said partition, and a closure member detachably secured to the open side of the body in flame tight relationship thereto.

4. An explosionproof electrical fitting comprising a hollow body formed with an opening in one side thereof and being provided with a partition arranged intermediate the open end of the body and the bottom wall thereof and dividing the body into a device compartment and a wiring compartment, said partition being formed with an opening to permit access to said wiring compartment through said opening in the body, a closure detachably secured to said partition and effecting a flame tight wall between said compartments, a device mounted in said device compartment, a plurality of lead conductors extending from said device compartment into said wiring compartment and being sealed in flame tight relation in said partition, and a cover member detachably secured to the open side of the body and forming a flame tight closure for said device compartment.

5. An explosionproof electrical fitting comprising a body formed with an opening in one side thereof, a partition arranged intermediate the open end of the body and the bottom wall thereof and dividing the body into a device compartment and a wiring compartment, said partition including a removable flame tight portion to provide access to the wiring compartment through said device compartment, an electrical device mounted in said device compartment, a plurality of lead conductors extending from said device compartment to said wiring compartment and being sealed in flame tight relation in said partition, and a cover member detachably secured to the open side of the body and forming a flame tight closure for said device compartment.

6. An explosionproof electrical fitting comprising a hollow body formed with an opening in one side thereof and being provided with an inwardly extending flange arranged intermediate the open end of the body and the bottom wall thereof and dividing the body into a device compartment and a wiring compartment, said flange being formed with an internally threaded opening to permit access to said wiring compartment, a supporting plate for supporting an electrical device, said plate threading into the opening in said flange and forming a flame tight wall between said compartments, a device mounted in said device compartment, said flange being formed with a plurality of apertures extending therethrough and being arranged to receive and retain a sealing medium, a plurality of lead conductors extending from said device compartment through said apertures into said wiring compartment and being sealed in flame tight relation in said apertures, and a cover member detachably secured to the open side of the body and forming a flame tight closure for said device compartment.

ROBERT A. BLOOD.